Nov. 22, 1949  J. R. MADEIRA  2,488,980
CONVEYER LOADING STATION
Filed April 8, 1947  3 Sheets-Sheet 1
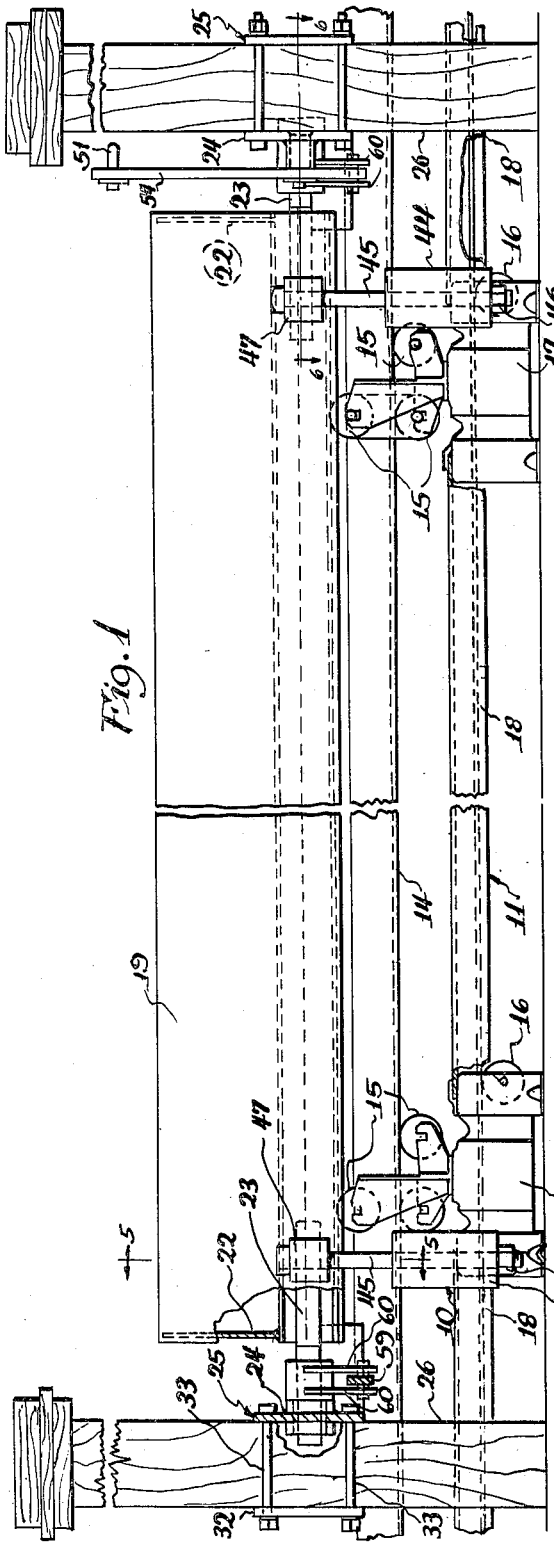
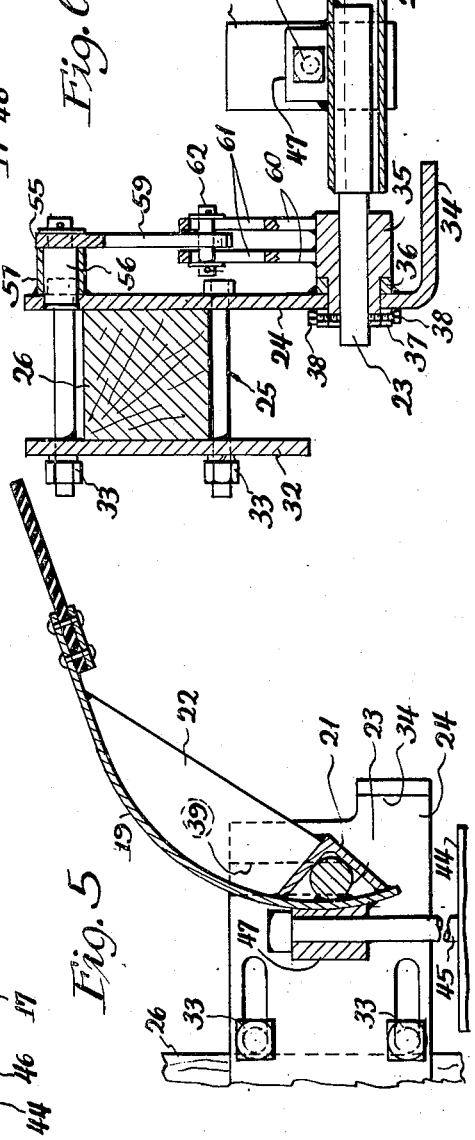
INVENTOR
John R. Madeira
Clarence F. Poole
Attorney Nov. 22, 1949  J. R. MADEIRA  2,488,980
CONVEYER LOADING STATION
Filed April 8, 1947  3 Sheets-Sheet 2
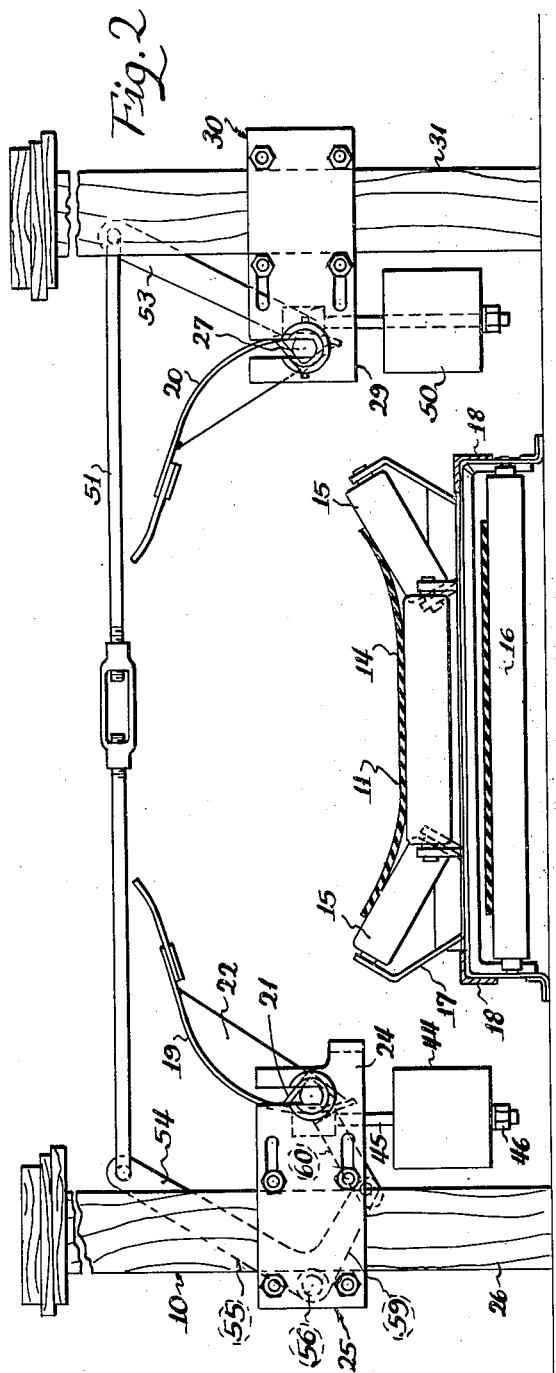
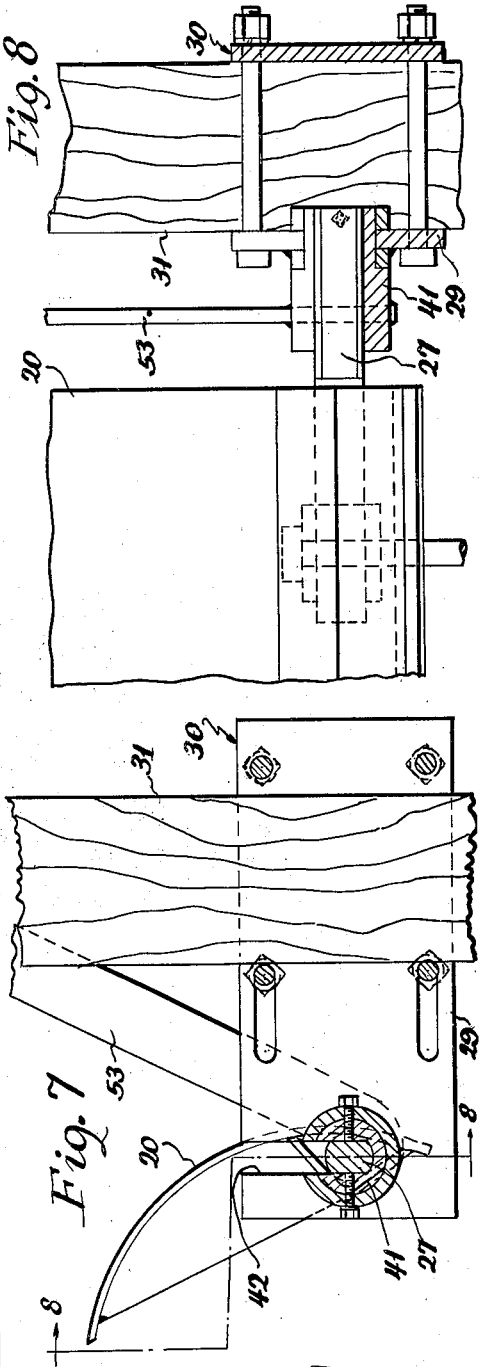
INVENTOR
John R. Madeira
Clarence F. Poole
Attorney Nov. 22, 1949   J. R. MADEIRA   2,488,980
CONVEYER LOADING STATION
Filed April 8, 1947   3 Sheets-Sheet 3
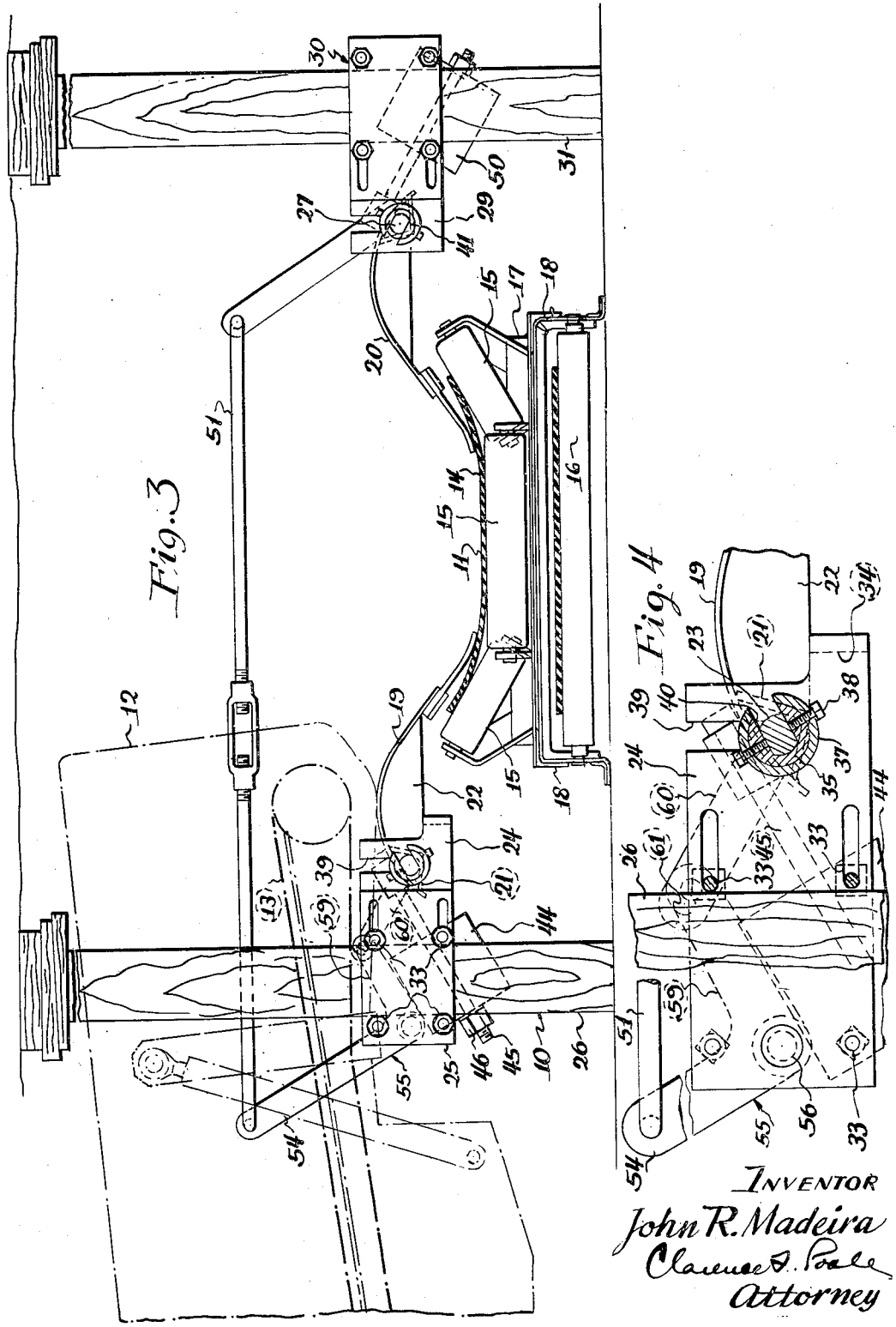
INVENTOR
John R. Madeira
Clarence T. Poole
Attorney Patented Nov. 22, 1949

2,488,980

UNITED STATES PATENT OFFICE 2,488,980

CONVEYER LOADING STATION

John R. Madeira, Chicago, Ill., assignor to Goodman Manufacturing Company, Chicago, Ill., a corporation of Illinois Application April 8, 1947, Serial No. 740,079

5 Claims. (Cl. 198—52)

This invention relates to improvements in conveyor loading stations particularly adapted for use in mines underground to load a belt conveyor with loose material such as coal directly from a shuttle car.

The principal objects of my invention are to provide a novel and improved form of loading station for loading a belt conveyor directly from a shuttle car, so arranged as to be operated by the shuttle car when the car moves to a discharge position and move to a position to protect the edges of the belt and deflect the coal discharged by the shuttle car onto the belt and to move out of the way of the conveyor to permit material on the conveyor to freely move past said loading station when the shuttle car is empty and moves away from the conveyor to receive a new load.

Another object of my invention is to provide a simple and efficient form of portable loading station for loading a belt conveyor directly from a shuttle car which may readily be dismantled and set up at a new loading position along the conveyor belt.

These and other objects of my invention will appear from time to time as the following specification proceeds and with reference to the accompanying drawings wherein:

Figure 1 is a view in side elevation of a loading station constructed in accordance with my invention, showing the deflecting aprons or baffles of the loading station raised above the belt conveyor;

Figure 2 is an end view of the loading station shown in Figure 1, showing the deflecting aprons raised above the belt conveyor and showing the belt conveyor in transverse section;

Figure 3 is an end view somewhat similar to Figure 2, but showing the deflecting aprons pivoted downwardly to overlap the sides of the belt of the conveyor and showing the shuttle car in outline in position to discharge onto the belt of the conveyor;

Figure 4 is a fragmentary transverse sectional view showing one of the deflecting aprons in an operative depressed position and showing certain details of the pivotal support for one end of said deflecting apron and certain details of the linkage connection between the two aprons, to cause the two aprons to operate together;

Figure 5 is a transverse sectional view taken substantially along line 5—5 of Figure 1;

Figure 6 is a horizontal sectional view taken substantially along line 6—6 of Figure 1;

Figure 7 is a fragmentary detail transverse sectional view showing the deflecting apron on the right-hand side of the conveyor in a raised position above the conveyor belt; and Figure 8 is a sectional view taken substantially along line 8—8 of Figure 7.

In the drawings a loading station 10 is shown as extending along opposite sides of a belt conveyor 11 and as being movable into an operative loading position to overlap the sides of the belt conveyor and to deflect material thereon by engagement with a shuttle car indicated generally by reference character 12, as said shuttle car moves into a discharge position, as shown by broken lines in Figure 3. Said shuttle car may be of any well known form having a conveyor 13 extending along its bottom for unloading the car by power, and is no part of my present invention so it is not herein shown or described in detail.

The belt conveyor 11 may be of a well known form of sectional belt conveyor which may be extended as the workings of the mine are extended along the entry, and is herein shown as being a troughed type of belt conveyor wherein an upper run 14 of the belt is supported on troughed rollers indicated generally by reference character 15, which form the belt in the form of a trough to carry coal therealong, and wherein a lower or return run of the belt is supported on flat rollers 16, 16. Said troughed rollers and said flat rollers are mounted on standards 17, 17 spaced at intervals along the conveyor and detachably held in spaced relation with respect to each other by spacing members 18, 18, as is well known to those skilled in the art.

The loading station 10 generally includes two aprons 19 and 20, one of which extends along one side of the belt conveyor and the other of which extends along its opposite side, directly opposite said first mentioned apron. Said aprons are movable into position to overlap the belt and deflect material discharged directly from the shuttle car 12 onto the conveyor, to assure that substantially all of the material discharged from said shuttle car will get onto the conveyor and to protect the edges of the belt from large lumps of material falling thereon. Said aprons are also movable into position so their inner ends are raised above the belt to permit the free passage of material along the belt which may be discharged thereon from other shuttle cars at other loading stations spaced along the belt.

The apron 19 has a transversely curved or convex upper surface, curved to extend over the edges of the belt of the conveyor when said apron is in an operative position so as to deflect material thereon. Said surface is also so formed as to cause said apron to pivot downwardly when engaged with the bottom of the discharge end of the shuttle car 12 as said shuttle car moves towards the conveyor. A flexible member such as a strip of rubber or fabric belting is secured to and extends along the inner edge of said apron and overlaps and extends along the upper run 14 of the belt of the conveyor when said apron is in a loading position.

The apron 19 is reinforced at its outer edge by an angle 21 secured thereto at the ends of its legs and extending therealong, and by gusset plates 22, 22 extending inwardly from said angle along the bottom of said apron adjacent opposite ends thereof. Aligned shafts 23, 23 are mounted beneath said apron and project longitudinally from opposite ends thereof. Said shafts extend within each end of said respective angles and, as herein shown, abut the inner sides of the legs of said angle and the underside of said apron and are suitably secured thereto, as by welding. Said shafts are pivotally mounted in support plates 24, 24, of supporting members 25, 25, which are supported the ground on vertical longitudinally spaced props or timbers 26, 26 interposed between and held in position between the mine floor and mine roof in a well known manner.

The opposite or right-hand deflecting apron 20 is like the apron 19 and has shafts 27, 27 projecting from its opposite ends adjacent its outer edge and extending longitudinally of the conveyor and pivotally mounted in support plates 29, 29 of supporting members 30, 30. Said supporting members are supported above the ground on longitudinally spaced props 31, 31 interposed between and rigidly held in position between the mine floor and the mine roof.

The support members 25, 25 each include the support plate 24 adapted to extend along and engage one side of an associated prop 26 and an engaging plate 32 adapted to extend along and engage the opposite side of said prop. Said plates 24 and 32 are held in engagement with said prop in the desired position above the ground by means of nuts and bolts 33, 33 extending through said plates and clamping said plates to said prop when the nuts of said bolts are tightened. The portions of said plates 24, 24 and 32, 32 through which the bolts 33, 33 on the inner sides of said props extend, are slotted to permit said plates to be secured to varying sizes of props. Each support plate 32 has an inwardly turned inner end 34 adapted to be engaged by the gusset plate 22, when the apron is in a lowered position to limit downward movement thereof.

The supporting member 30 for the apron 20 is of a construction somewhat similar to the supporting member 25 and is secured to its prop 31 in the same manner as the supporting member 25 is secured to its prop 26, so need not herein be described in detail.

A sleeve 35 is pivotally mounted in each support plate 24 (see Figures 4 and 6). Said sleeves have the aligned shafts 23, 23 mounted therein so as to turn therewith and form pivotal supports for said shafts on said support plates. Each of said sleeves has a shouldered portion abutting a boss 36 secured to the inner side of said support plate. A collar 37 abuts the outer side of said support plate and is secured to the outer end of said sleeve as by set screws 38, 38, and serves to hold said sleeve to said plate. Said set screws extend through said collar and sleeve and engage opposite flattened sides of the shaft 23 when mounted in said sleeve. The support plate 24 is provided with a slot 39 opening towards its top, and leading into the apertured portion of said plate in which said sleeve is rotatably mounted. Said slot is adapted to register with a slot 40 formed in said collar and sleeve, when said sleeve is turned to the proper position, to permit the flattened portion of said shaft to be readily mounted in said sleeve or to be removed therefrom.

Opposite sides of the ends of the aligned shafts 27, 27 projecting from opposite ends of the apron 20 are likewise flattened and are adapted to be mounted within slots formed in sleeves 41, 41 journaled in the support plates 29, 29 in a manner similar to which the sleeves 35, 35 are journaled in the support plates 24, 24. Said support plates also have upwardly opening slotted portions 42, 42 adapted to register with the slots formed in said sleeves, to permit ready assembly of said apron on the support members 30, 30.

Counterweights 44, 44 extend outwardly from opposite sides of the apron 19, to lift the inner side of said apron above the belt conveyor 11 when the shuttle car 12 is disengaged therefrom. Said counterweights are mounted on the ends of bolts 45, 45 depending from said apron, when said apron is in a raised position, and are held thereto by nuts 46, 46 threaded on the outer ends of said bolts. Said bolts extend through lugs 47, 47 extending outwardly from said apron, adjacent its opposite sides.

Counterweights 50, 50 similar to the counterweights 44, 44 are operatively connected to the apron 20 in a manner similar to which said counterweights 44, 44 are connected to the apron 19, to normally hold said apron 20 in the upwardly raised position shown in Figure 2.

The aprons 19 and 20 are connected to operate together by means of two longitudinally spaced transversely extending adjustable tie rods 51, 51 disposed between the ends of said aprons and the props 26, 26 and 31, 31. Each of said tie rods is pivotally connected at one of its ends to the upper end of a lever arm 53 secured to and extending upwardly and angularly outwardly from a respective sleeve 41, when the apron 20 is in the raised position shown in Figure 2. The opposite end of said tie rod is pivotally connected to a lever arm 54 of a bell crank 55. Each of said bell cranks is pivotally mounted intermediate its ends on a pin 56 mounted in a support plate 24 and extending within and through a sleeve 57, secured to and extending inwardly from said support plate (see Figure 6). A lever arm 59 of said bell crank extends inwardly and downwardly from the pivotal pin 56, when the aprons 19 and 20 are in the raised position shown in Figure 2, and between two parallel spaced lever arms 60, 60 secured to and projecting angularly outwardly from a respective sleeve 35. Each of said lever arms 60 has a slot 61 extending longitudinally therealong and forming a slidable connecting means for a pivotal pin 62, extending through said lever arm 59 of said bell crank and operatively connecting said bell crank to the lever arm 60.

When the discharge end of the shuttle car 12 moving towards the belt conveyor 11, at right angles with respect thereto, engages the convexly formed outer surface of the apron 19, said shuttle car will move along the curved surface of said apron and move said apron into position to engage the flexible inner side of said apron with said belt, as shown in Figure 3. At the same time the opposite or right-hand apron 20 will be moved into position to engage its flexible inner side with the upper run of said belt by means of the levers 60, 60, bell cranks 59, 59, tie rods 51, 51, and lever arms 53, 53 in the hereinbefore described manner. When said aprons are in the position shown in Figure 3, the shuttle car 12 is in position to discharge onto the upper run of said belt and said aprons are arranged to deflect the material discharged from said shuttle car onto the upper run of said belt and prevent material from being spilled beyond the edges of said belt, and also protect the edges of the belt from large lumps of coal which would otherwise drop thereon.

It may be seen from the foregoing that a simplified form of portable loading station has been provided for loading a belt conveyor directly from a shuttle car which is operated to move to a loading position by movement of the shuttle car towards the belt conveyor into a position to discharge material thereon, and that the counterweights 44, 44 and 50, 50 raise said aprons above the belt as soon as the shuttle car is disengaged therefrom, as it moves away to pick up a new load of material.

It may further be seen that the loading station of my invention is of a simplified construction which may readily be taken apart and moved and reassembled when it is desired to locate the station in a different position along the belt conveyor, as certain sections of the mine are worked out.

It should also be noted that the shuttle car may load from either side of said loading station engaging either of the aprons 19 or 20, to move both of said aprons downwardly to protect and deflect material onto the belt of the conveyor.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. A loading station for loading a belt conveyor directly from a shuttle car including an apron extending along each side of the conveyor, said aprons being mounted adjacent their outer sides for movement about axes extending longitudinally thereof and spaced outwardly from the conveyor and normally extending in an upright position above the conveyor, a linkage connection connecting said aprons to pivot together, each of said aprons having a convexly formed outer surface of a uniform contour adapted to be engaged by the discharge end of a shuttle car to permit said shuttle car to engage and partially pass over one of said aprons and depress both of said aprons to extend over the belt of the conveyor by movement of said shuttle car towards the conveyor and each of said aprons having a flexible inner edge adapted to be flexibly depressed upon engagement with the upper surface of said belt, to guide and deflect material discharged by said shuttle car onto said conveyor and to protect the edges of the belt of the conveyor.

2. A loading station for loading a belt conveyor directly from a shuttle car including a separate frame extending along each side of the conveyor and spaced above the ground outwardly from the outer limits of the conveyor, and each of said frames including an apron mounted for pivotal movement about an axis extending longitudinally of the conveyor, said aprons being depressible to overlap the edges of the conveyor and having a separate counterweight connected therewith to raise the inner ends of said aprons above the conveyor and permit material discharged onto the conveyor from other loading stations to freely pass along the conveyor, a link extending transversely of the conveyor, and levers connected between said aprons and opposite ends of said link for connecting said aprons to operate together, each of said aprons having a convexly formed outer engaging and deflecting surface of a uniformly curved contour so shaped as to be engaged by the discharge end of a shuttle car and to pivot said aprons downwardly to extend over the edges of the belt of the conveyor as said shuttle car engages the outer surface of one of said aprons and moves towards the conveyor in a direction transverse to the direction of travel of the conveyor, to position said aprons to a position to protect the edges of the belt of the conveyor, and each of said aprons also having a flexible inner edge adapted to flexibly engage the upper surface of said belt to protect said belt and to guide and deflect material discharged by said shuttle car directly onto the conveyor.

3. A loading station for loading a belt conveyor directly from a shuttle car including two longitudinally spaced props interposed between the mine floor and mine roof at each side of the conveyor, a separate support frame adapted to be mounted on each of said props, means for securing said support frames to their associated props in vertically spaced relation with respect to the ground, an apron pivotally mounted between a pair of said support frames along each side of said conveyor and movable into position to extend along said conveyor to deflect material thereon, and into a position above said conveyor to permit material discharged onto the conveyor from other loading stations to freely pass therealong, each of said aprons having an outer convexly formed engaging and deflecting surface extending along said conveyor and of such a uniformly curved formation as to be pivoted downwardly into engagement with the conveyor when engaged by the discharge end of a shuttle car and upon movement of said shuttle car towards the conveyor, counterweights for raising said aprons to an inoperative position and a linkage connection between said aprons to connect said aprons to operate together including a transversely extending link disposed above said conveyor and lever mechanism connected with opposite ends of said link and having operative connection with said aprons.

4. In a portable loading station for belt conveyors, for loading a belt conveyor directly from a shuttle car, an apron extending along each side of the conveyor and pivotally movable into position to overlap opposite edges of the conveyor, either one of said aprons being adapted to be engaged by the discharge end of a shuttle car as it moves towards the conveyor to a loading position and during the unloading operation, and both of said aprons being moved downwardly to overlap the conveyor by movement of said shuttle car towards the conveyor upon engagement with either of said aprons by said shuttle car, and rising upwardly above the conveyor as said shuttle car has discharged its load and moves away from the conveyor, and quickly detachable pivotal mountings for said aprons, mounting said loading station for ready movement to new positions along the conveyor, including two support frames at each side of the conveyor, said support frames being spaced from opposite ends of said aprons and having sleeves pivotally mounted therein, shafts projecting from opposite ends of each of said aprons and adapted to be mounted in said sleeves, said sleeves and said support frames having registering slots formed therein, and said slots in said support frame opening towards the top of said frame, to receive said shafts and permit said shafts to be readily mounted in said sleeves and to mount said aprons above the ground for movement about axes extending longitudinally of the conveyor.

5. In a portable loading station for belt conveyors, for loading a belt conveyor directly from a shuttle car, an apron extending along each side of the conveyor and pivotally movable into position to overlap opposite edges of the conveyor, either one of said aprons being adapted to be engaged by the discharge end of a shuttle car as it moves towards the conveyor to a loading position and during the unloading operation, and both of said aprons being moved downwardly to overlap the conveyor by movement of said shuttle car towards the conveyor upon engagement with either of said aprons by said shuttle car, and rising upwardly above the conveyor as said shuttle car has discharged its load and moves away from the conveyor, and quickly detachable pivotal mountings for said aprons, mounting said loading station for ready movement to new positions along the conveyor, including two props interposed between the mine floor and roof at each side of the conveyor, two support frames each including a supporting plate adapted to engage one side of one of said props and an engaging plate adapted to engage the other side of said prop, and holding means for holding said plates in engagement with said props in a position spaced above the ground, each of said supporting plates having a sleeve pivotally mounted therein for movement about an axis extending longitudinally of the conveyor, shafts projecting from opposite ends of each of said aprons and adapted to be mounted in said sleeves and said sleeves having slots formed therein adapted to receive said shafts and said plates having slots formed therein opening towards the mine roof, and said sleeves being movable into position to register said slots in said plates and sleeves with each other, to receive said shafts and permit said shafts to be readily mounted in said slotted portions of said sleeves, and mount said aprons above the ground for movement about axes extending longitudinally of the conveyor.

JOHN R. MADEIRA.

REFERENCES CITED

The following references are of record in the file of this patent:

UNITED STATES PATENTS

| Number | Name | Date |
| --- | --- | --- |
| 2,367,609 | Prins | Jan. 16, 1945 |